US012359942B2

(12) United States Patent
Evans et al.

(10) Patent No.: US 12,359,942 B2
(45) Date of Patent: Jul. 15, 2025

(54) ROTARY ENCODER

(71) Applicant: RENISHAW PLC, Wotton-under-Edge (GB)

(72) Inventors: Finlay Jonathan Evans, Malmesbury (GB); James Reynolds Henshaw, Stroud (GB)

(73) Assignee: RENISHAW PLC, Wotton-under-Edge (GB)

(*) Notice: Subject to any disclaimer, the term of this patent is extended or adjusted under 35 U.S.C. 154(b) by 407 days.

(21) Appl. No.: 17/778,652

(22) PCT Filed: Dec. 2, 2020

(86) PCT No.: PCT/GB2020/053084
§ 371 (c)(1),
(2) Date: May 20, 2022

(87) PCT Pub. No.: WO2021/116660
PCT Pub. Date: Jun. 17, 2021

(65) Prior Publication Data
US 2023/0003557 A1    Jan. 5, 2023

(30) Foreign Application Priority Data
Dec. 9, 2019   (GB) ................................. 1918002

(51) Int. Cl.
*H03M 1/22*        (2006.01)
*G01D 5/347*       (2006.01)
(52) U.S. Cl.
CPC ....... *G01D 5/34738* (2013.01); *G01D 5/3473* (2013.01); *G01D 5/34784* (2013.01)

(58) Field of Classification Search
CPC ...................... G01D 5/34738; G01D 5/34776
USPC ....................................................... 341/11, 13
See application file for complete search history.

(56) References Cited

U.S. PATENT DOCUMENTS

| | | |
|---|---|---|
| 1,183,190 A | 5/1916 | Hansell |
| 2,855,228 A | 10/1958 | Peter et al. |
| 3,463,520 A | 8/1969 | Turro |
| 3,708,243 A | 1/1973 | Wooden |
| 3,740,085 A | 6/1973 | Evans |
| 3,774,675 A | 11/1973 | Yoshiro |

(Continued)

FOREIGN PATENT DOCUMENTS

| | | |
|---|---|---|
| AU | 2012100637 A4 | 8/2012 |
| CN | 108375385 A | 8/2018 |

(Continued)

OTHER PUBLICATIONS

2022.*

(Continued)

*Primary Examiner* — Peguy Jean Pierre
(74) *Attorney, Agent, or Firm* — Oliff PLC

(57) ABSTRACT

A rotary scale apparatus for an encoder apparatus including a planar disc on which at least one track including scale features is provided, in which the planar disc includes a hole through its centre for receiving a cylindrical shaft, and in which the rotary scale member includes at least three cantilevered spring members which are provided substantially in plane with the planar disc and spaced around the edge of the hole, for engaging with, and radially locating the disc on, a cylindrical shaft inserted therethrough.

20 Claims, 4 Drawing Sheets

(56) References Cited

U.S. PATENT DOCUMENTS

| | | |
|---|---|---|
| 4,183,688 A | 1/1980 | Persson |
| 4,472,713 A | 9/1984 | Breslow |
| 4,476,457 A | 10/1984 | Kondo |
| 4,620,814 A | 11/1986 | May |
| 4,718,879 A | 1/1988 | Wada |
| 4,835,505 A | 5/1989 | Hattori et al. |
| 4,940,936 A | 7/1990 | Grillo et al. |
| 4,942,295 A | 7/1990 | Brunner et al. |
| 4,959,542 A | 9/1990 | Stephens |
| 4,974,962 A | 12/1990 | Stephens et al. |
| 5,174,680 A | 12/1992 | Nakamura et al. |
| 5,218,199 A | 6/1993 | Miller |
| 5,698,849 A | 12/1997 | Figueria, Jr. |
| 6,087,748 A | 7/2000 | Donner |
| 6,098,295 A | 8/2000 | Feichtinger |
| 6,255,644 B1 | 7/2001 | Taniguchi et al. |
| 6,293,021 B1 | 9/2001 | Freitag et al. |
| 6,396,016 B1 | 5/2002 | Lin et al. |
| 6,481,115 B1 | 11/2002 | Henshaw et al. |
| 6,536,267 B2 | 3/2003 | Kieselbach |
| 6,960,758 B2 | 11/2005 | Tenca et al. |
| 7,367,128 B2 | 5/2008 | McMurtry et al. |
| 7,601,948 B1 | 10/2009 | Setbacken et al. |
| 9,103,381 B2 | 8/2015 | Arnstein |
| 9,658,049 B2 | 5/2017 | Arnstein et al. |
| 2001/0006314 A1 | 7/2001 | Braun |
| 2002/0089300 A1 | 7/2002 | Uchiyama et al. |
| 2003/0042408 A1 | 3/2003 | Setbacken et al. |
| 2003/0094568 A1 | 5/2003 | Meschko |
| 2005/0047691 A1 | 3/2005 | Niebling et al. |
| 2005/0069233 A1 | 3/2005 | Horiuchi et al. |
| 2005/0087683 A1 | 4/2005 | Kawai et al. |
| 2007/0069594 A1 | 3/2007 | Braun |
| 2008/0240849 A1 | 10/2008 | Lindemann |
| 2009/0252549 A1 | 10/2009 | Takeuchi et al. |
| 2009/0323203 A1 | 12/2009 | Adams et al. |
| 2010/0038527 A1 | 2/2010 | Madore |
| 2012/0076575 A1 | 3/2012 | Smith |
| 2012/0206024 A1 | 8/2012 | Yoshida et al. |
| 2013/0296062 A1 | 11/2013 | Arnstein |
| 2023/0003557 A1 | 1/2023 | Evans et al. |

FOREIGN PATENT DOCUMENTS

| | | |
|---|---|---|
| CN | 209524932 U | 10/2019 |
| CN | 214843296 U | 11/2021 |
| DE | 24 29 741 A1 | 1/1976 |
| DE | 25 18 774 A1 | 11/1976 |
| DE | 34 19 101 C1 | 7/1985 |
| DE | 41 30 111 A1 | 3/1993 |
| DE | 196 01 271 A1 | 7/1997 |
| DE | 29622996 U1 | 10/1997 |
| DE | 19742114 A1 | 3/1999 |
| DE | 197 51 019 A1 | 6/1999 |
| DE | 10 2008 046 540 A1 | 3/2010 |
| DE | 10 2010 030 121 A1 | 2/2011 |
| DE | 10 2011 015 886 A1 | 10/2012 |
| EP | 0 204 345 A2 | 12/1986 |
| EP | 0 207 121 A1 | 1/1987 |
| EP | 0 213 732 A1 | 3/1987 |
| EP | 0 293 487 A1 | 12/1988 |
| EP | 0 207 121 B1 | 1/1990 |
| EP | 0 520 853 A1 | 12/1992 |
| EP | 0 927 873 A1 | 7/1999 |
| EP | 1 094 302 A2 | 4/2001 |
| EP | 1 526 363 A1 | 4/2005 |
| EP | 2 028 449 A1 | 2/2009 |
| EP | 2 660 567 A1 | 11/2013 |
| EP | 2 660 610 A2 | 11/2013 |
| GB | 1511801 A | 5/1978 |
| GB | 2 358 063 A | 7/2001 |
| GB | 2 388 431 A | 11/2003 |
| JP | S59-142420 A | 8/1984 |
| JP | S60-16017 U | 2/1985 |
| JP | S63-176869 A | 7/1988 |
| JP | S64-3330 A | 1/1989 |
| JP | H02-16412 A | 1/1990 |
| JP | H05-272990 A | 10/1993 |
| JP | H06040812 U | 5/1994 |
| JP | H06-347290 A | 12/1994 |
| JP | H11-2256 A | 1/1999 |
| TW | 200600753 A | 1/2006 |
| TW | I269021 B | 12/2006 |
| WO | 2004/008076 A1 | 1/2004 |
| WO | 2010/072498 A1 | 7/2010 |
| WO | 2022175656 * | 8/2022 ........... G01B 5/0008 |

OTHER PUBLICATIONS

"E4P Assembly Instructions"; US Digital; www.usdigital.com; pp. 1-2.

Feb. 12, 2021 Search Report issued in International Patent Application No. PCT/GB2020/053084.

Feb. 12, 2021 Written Opinion of the International Searching Authority issued in International Patent Application No. PCT/GB2020/053084.

May 29, 2020 Search Report issued in British Patent Application No. GB1918002.5.

* cited by examiner

ROTARY ENCODER

This invention relates to a rotary encoder, in particular to a rotary scale and an encoder apparatus comprising a rotary scale and a readhead for reading the rotary scale.

Metrological scales are used in the position measurement of a parts of a machine which can move relative to each other. Metrological scale typically has a series of features on it which can be read by a readhead so that the readhead can provide a measure of its position along, or around, the scale. The metrological scale can be mounted onto one part of a machine and is read by a suitable readhead which is attached to another part of the machine. Types of metrological scale include magnetic scales (in which the scale features are provided by features having particular magnetic properties), capacitive scales (in which the features are provided by features having particular capacitive properties), inductive scales (in which the features are provided by features having particular inductive properties) and optical scales (in which the features are provided by features having particular optical properties). Optical scales can be transmissive or reflective. An example of an optical scale configuration is disclosed in EP-A-0 207 121 and also U.S. Pat. No. 4,974,962.

For measuring rotary displacement, such a scale may be provided on a member which rotates in use with the shaft or other rotary part relative to the readhead. In particular, the member which has the scale features and which rotates in use with the shaft can be a disc. In particular, glass or metal discs are commonly used in high performance encoders, and typically the scale features are formed directly in/on the glass or metal material. The inventors are concerned with providing improvements in such glass or metal disc scale, in particular with providing a low-profile, high performance (e.g. high resolution/low error) disc scale.

Accordingly, the present invention relates to an improved rotary encoder, in particular to an improved disc encoder.

According to a first aspect of the invention there is provided a rotary scale apparatus for an encoder apparatus comprising at least one track of scale features for reading by a readhead to determine the relative position thereof, the rotary scale apparatus comprising a planar disc comprising a through hole for receiving a cylindrical shaft, and in which the rotary scale member comprises at least three cantilevered spring members which are provided substantially in plane with the planar disc and spaced around the edge of the hole, for engaging with, and radially locating (e.g. centring) the planar disc on, a cylindrical shaft inserted therethrough.

Such a configuration has been found to provide a particularly effective and compact self-locating rotary encoder apparatus. For instance, it has been found to be difficult to provide an effective (e.g. highly repeatable) in-plane self-locating solution for disc scales, especially for metal or glass discs. The use of cantilevered spring members has been found to be particularly advantageous over other configurations which use non-cantilevered spring arrangements. With the improved self-locating performance of the rotary encoder apparatus provided by the configuration of the present invention (e.g. the better it is at predictably, e.g. repeatably, locating itself relative to a shaft, for instance so as to self-centre the disc/scale markings with respect to the shaft) it is possible to provide an improved set up of the encoder apparatus and thereby improve the metrological performance of the encoder.

Whilst there have already been attempts to make such so-called "self-locating" (e.g. "self-centring") rotary encoders (e.g. such as those described in U.S. Pat. Nos. 6,255,644 and 6,293,021), our inventors have found existing solutions to be unsatisfactory, in particular for thin/planar/compact rotary encoders, and where there are high demands on the predictability of the self-locating performance of the scale member.

Compared to a flexure supported at both ends (e.g. a flexure provided by a slot in the material), the spring force provided by a cantilevered spring member is less affected by its width. Accordingly, due to manufacturing tolerances which can cause the width of springs/flexures to vary, it has been found that the use of cantilevered spring members (instead of flexures supported at both ends) can provide a more predictable self-locating ability for a disc scale with in-plane spring members. Indeed, such a difference can be significant with today's ever-increasing demand for higher accuracy position encoders. For example, the inventors are facing demands that a scale can self-centre on a shaft with less than 10 μm (microns) eccentricity and in some instances less than 5 μm (microns) eccentricity, and the claimed configuration has been instrumental in helping the inventors meet such demands.

Such a configuration can also help to ensure that the self-locating performance of an encoder disc is highly repeatable. This can be important because the scale features for a glass or metal scale disc are commonly formed by mounting the glass or metal disc on the shaft of manufacturing apparatus, and then forming the marks with the disc on the shaft, wherein the glass or metal disc is rotated by the shaft so that scale features can be formed around the disc's surface. It is important that when the disc is removed from the manufacturer-site shaft and subsequently mounted on a customer-site shaft, it sits relative to the customer's shaft in the same relative radial location as it did on the manufacturer-site shaft. In view of that the customer and manufacturer-site shafts are not likely to be exactly the same diameter, it is desirable to ensure that the flexures which radially locate the disc on the shaft behave repeatably, even in the event of non-identically sized shafts. It has been found that even small differences in the diameter of the customer and manufacturer-site shaft can have a significant adverse effect on where the disc sits on customer-site shaft compared to the manufacturer-site shaft, which can in turn impact the performance of the encoder.

As will be understood, the cantilevered spring members will be elastically deformable, in particular in the radial dimension (with respect to the disc scale).

Accordingly, preferably, when in use (i.e. when mounted on a shaft), the cantilevered spring members can each be radially displaced within their elastic limit, and they each, in return, provide a force which together work to radially locate the disc on the shaft.

Preferably, each spring member provides a substantially identical spring force for a given radial deflection. The cantilevered spring members can be nominally/substantially identical in shape and size. This can simplify the design and manufacture of the cantilevered spring members so as to provide nominally/substantially equal, balanced, self-locating forces. Also, this can be particularly preferable when the repeatability of the radial self-location of the disc across shafts of different sizes is important.

As will be understood, each cantilevered spring member can be configured such that its length extends in a generally circumferential direction around the edge of the hole. Preferably, at least one cantilevered spring member extends in an opposite direction to another cantilevered spring member. For example, preferably at least one cantilevered spring member extends in a generally clockwise direction around the edge of the hole, and at least one other cantilevered spring member extends in a generally anti-clockwise direction around the edge of the hole. It has been found that such a configuration can help to avoid adverse forces between the disc and shaft when mounted, which can affect the stability of the disc. For example, if the length of a cantilevered spring member changes with temperature, then when mounted on a shaft, each cantilevered spring member could exert a turning force on the shaft/disc. The effect of such turning forces can be reduced/negated by arranging at least one cantilevered spring member which extends in opposite direction to the other(s). This can be especially desirable for those applications where the utmost accuracy and stability is demanded.

The rotary scale member can comprise at least three pairs of cantilevered spring members provided in plane with the planar disc and spaced around the edge of the hole. The planar disc could have a combination of pairs of cantilevered springs and single springs. However, it can be advantageous for all cantilevered spring members to be provided in pairs, to help ensure that the self-locating spring forces are balanced.

In line with the preceding two paragraphs, the rotary scale member can comprise at least three pairs of cantilevered spring members, wherein the cantilevered spring members in a pair extend in opposite directions relative to each other. In other words, the rotary scale member can comprise at least three pairs of cantilevered spring members, wherein each spring member in a pair can be configured such that their free ends are proximal each other and their fixed (or "root") ends are distal each other. In such a case, within each pair of cantilevered spring members, any change in the length of each cantilevered spring member (e.g. due to temperature changes) will have an opposing effect on the turning/twisting of the disc relative to the shaft. In the preferred embodiments where each cantilevered spring members are substantially identical in configuration, the turning force exerted due to the change in length of each cantilevered spring members should be substantially equal and opposite, and therefore the net turning force exerted by a pair of cantilevered spring members can be substantially zero.

Preferably, the cantilevered springs (or the pairs of cantilevered springs) are arranged equiangularly around the hole. In a particularly preferred embodiment, there are provided three pairs of cantilevered springs, in which the pairs of cantilevered springs are arranged equiangularly around the hole.

In can be preferred that the width of a cantilevered spring member, measured between the sides facing toward and away from the centre of the hole, progressively narrows towards its free end. Preferably, at least the side of a cantilevered spring member facing toward the centre of the hole is substantially straight. The inventors found that, to ensure equal stress distribution along the length of a cantilevered spring member, the theoretically ideal shape for a cantilevered spring member is a parabolic shape. However, the inventors also found that found that there are disadvantages with providing parabolic shaped cantilevered spring members, such as, for example, that the rate of change of force applied by the flexure can vary with deflection as the point of the contact between the shaft and flexure moves. Having a straight-edged spring member which faces/engages the shaft in use reduces this effect, thereby providing a more stable, and practically better solution than the theoretically ideal parabolic shape.

Suitable disc materials for the planar disc include metal or glass. In a preferred embodiment, the planar disc comprises a steel, in particular stainless steel disc, but as will be understood, other metals such as aluminium or titanium can also be used.

The cantilevered spring members and planar disc can be formed (in particular cut) from a single sheet of material. The use of sheet material, and forming (e.g. cutting) the features from the sheet material can help to ensure that the root of the cantilevered spring member is in plane with the disc, and also helps to ensure that the forces exerted on the disc are kept in plane, thereby reducing/avoiding moments on the disc which could warp the disc. Such a configuration also helps to facilitate a very compact rotary encoder.

Preferably the track of scale features comprises a complete annular track of scale features (e.g. as opposed to just comprising a partial arc). Preferably the at least one track of scale features is provided on the planar face of the planar disc. The scale features in a track could be incremental features or absolute features. The disc scale could comprise more than one track.

The disc scale could comprise at least one additional hole located between the hole for the shaft and the outer edge of the planar disc. Such an additional hole could be provided to help facilitate securing of the disc scale to a shaft, e.g. to help facilitate securing the disc scale to a body on which the shaft is provided. For example, a bolt could be passed through the hole to secure the disc to the body, and/or the adhesive could be located in the hole to secure the disc to the body.

Preferably, the thickness of the planar disc is not more than 5 mm, for example not more than 2.5 mm, for instance not more than 1.5 mm. As will be understood, in order for the disc to be self-supporting (i.e. not collapse under its own weight), and/or to ensure effective spring members, the disc will have to have sufficient thickness. Such an appropriate minimum thickness will depend on various factors including the diameter of the planar disc and the material of the planar disc. Typically, the inventors have found that it is preferably to have a disc which is not less than 0.5 mm, for instance not less than 0.6 mm, in particular not less than 0.7 mm. Preferably, the planar disc has substantially uniform thickness.

According to another aspect of the invention there is provided an apparatus comprising a first and second relatively rotatable parts, in which a rotary scale apparatus as described above is mounted on one of the first and second relatively rotatable parts, for rotation therewith, and at least one readhead mounted on the other of the first and second relatively rotatable parts for reading the rotary scale apparatus' scale features.

Embodiments of the invention will now be described, by way of example only, with reference to the following drawings, in which.

Figure 1:
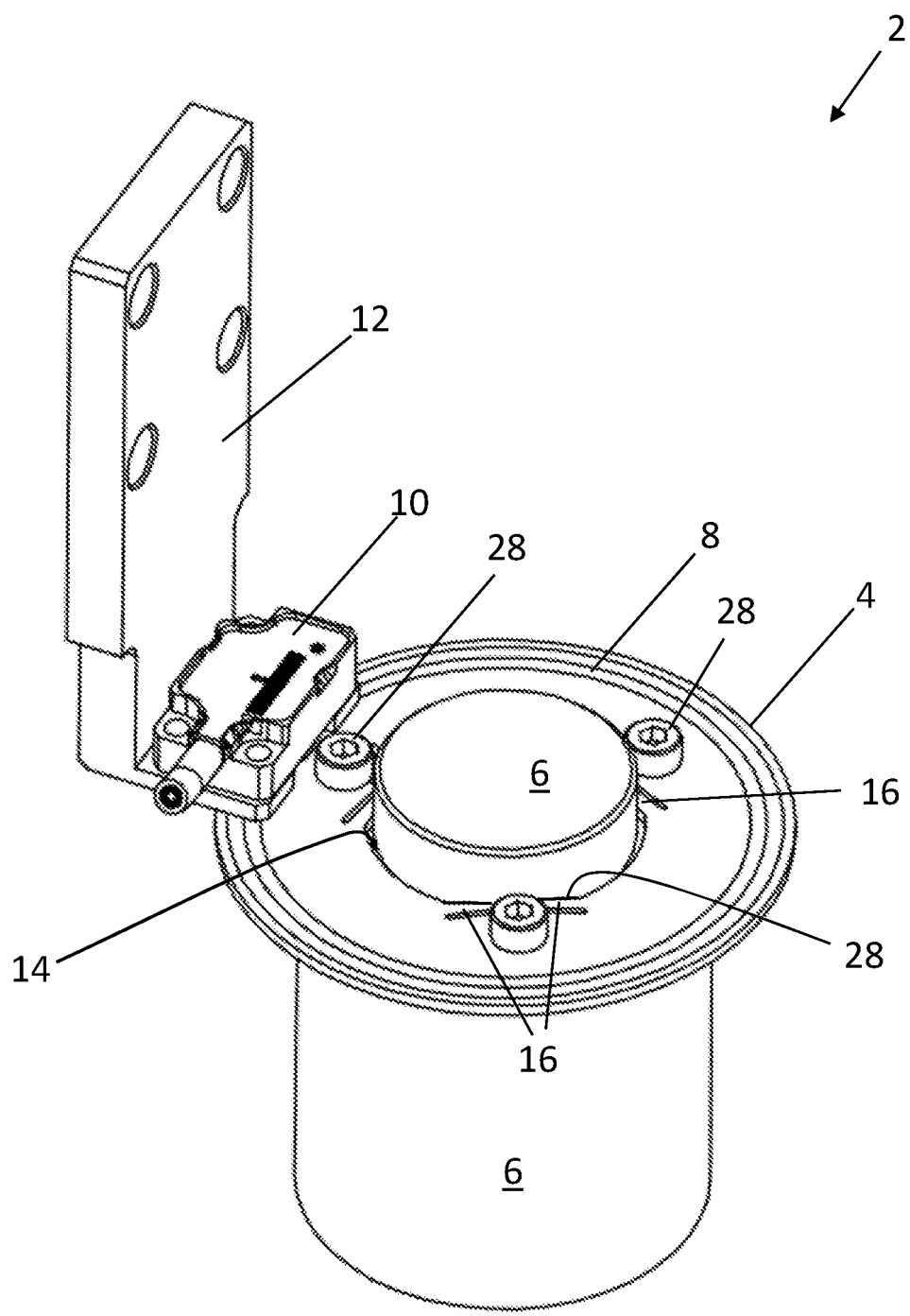
FIG. 1 is an isometric view of disc scale member according to the present invention mounted on a shaft, with a readhead arranged to read the scale.
Figure 2:
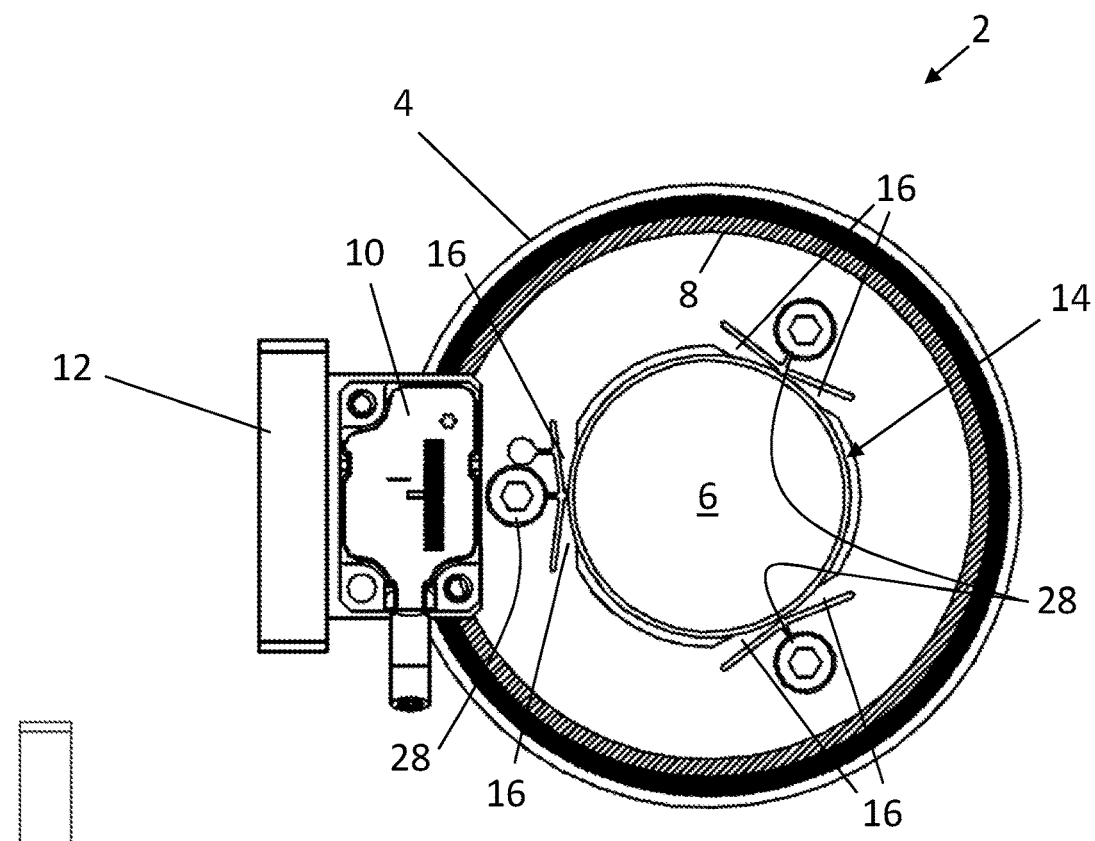
FIG. 2 is a plan view of the arrangement of FIG. 1.
Figure 3:
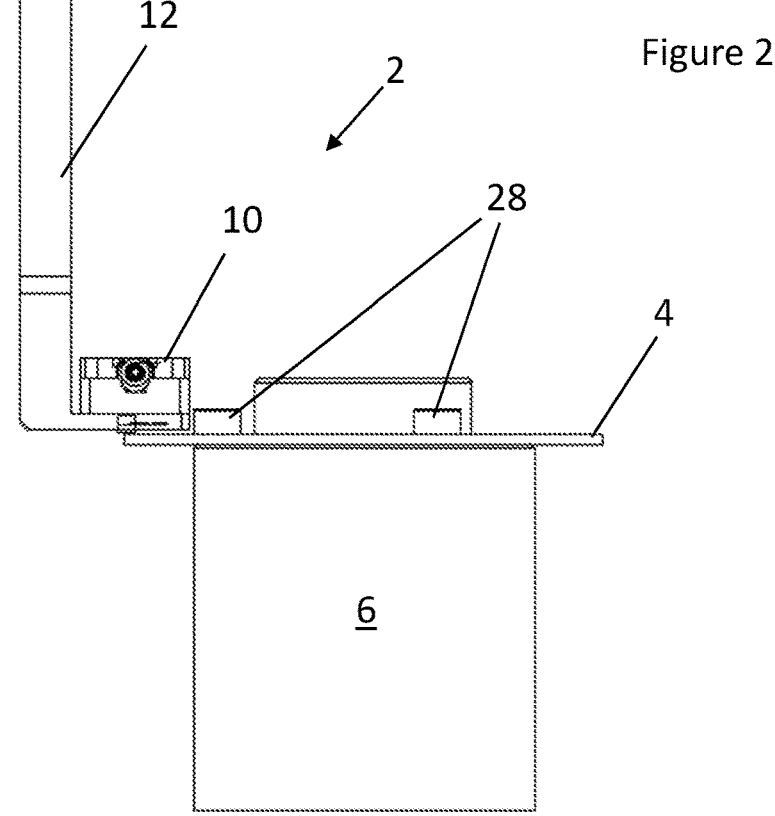
FIG. 3 is a side view of the arrangement of FIG. 1.

Referring to FIGS. 1 to 3, there is shown an encoder apparatus 2 comprising a disc scale member 4 according to one example embodiment of the present invention. The disc scale member 4 is shown in isolation in FIG. 4.

In FIGS. 1 to 3, the disc scale member 4 is shown mounted on a cylindrical shaft 6 of a machine. The disc scale member 4 is planar in configuration. In particular, the disc scale member 4 is formed from a thin sheet of material, in this embodiment, from stainless steel, which is about 1 mm thick. For context, the diameter of the disc scale member 4 in this embodiment is about 55 mm. As will be understood, the invention is not limited to discs of such a size, and such dimensions are given merely as an example of a disc. Also, the disc could be made from other metallic materials, such as aluminium.

The disc scale member 4 has a scale track 8 on one of its planar faces, extending completely annularly around the disc scale member. The scale track 8 comprises a series of features which a readhead 10 (mounted on a component 12 which is fixed relative to the cylindrical shaft 6) can read to determine the relative position/motion of the scale disc 4 and the readhead 10. In the embodiment described, the encoder apparatus is an optical encoder apparatus, but this need not necessarily be the case. For instance, the encoder apparatus could be a magnetic, inductive or capacitive encoder apparatus. Furthermore, in the embodiment described, the encoder apparatus is a reflective optical encoder apparatus (in that the light from the readhead is reflected by the scale back toward the readhead, and in that the readhead's illumination and scale detection components are on the same side of the scale). However, this need not necessarily be the case, and the encoder apparatus could be a transmissive optical encoder.

In this embodiment, the encoder apparatus 2 is an incremental encoder apparatus. Accordingly, in this embodiment the scale disc 4 is an incremental scale disc and the scale track 8 comprises a series of periodically arranged features which the readhead 10 can read in order to provide a count of the relative position/movement of the scale disc 4 and the readhead 10. As is common in the field of incremental encoder apparatus, the scale disc could comprise one or more reference marks which can be read by the readhead which it passes the readhead, so that the readhead can identify a reference position on the disc scale member. Of course, the encoder apparatus could be an absolute encoder apparatus instead of an incremental encoder apparatus. Accordingly, the scale disc 4 could be an absolute scale disc, in which the scale track(s) thereon can comprise features defining a series of unique absolute positions such that the absolute position of the scale disc and readhead can be determined on start-up without requiring relative motion of the disc scale member and the readhead.

Figure 4:
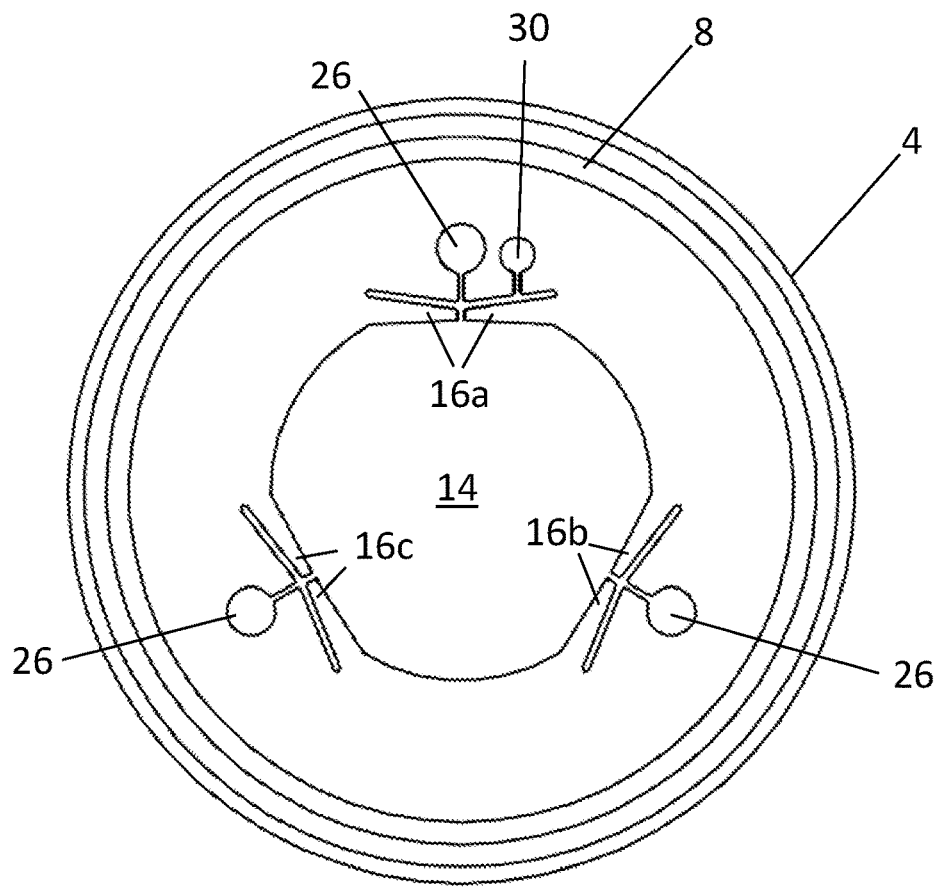
FIG. 4 is a plan view of the disc scale member of FIG. 1 shown in isolation.

As best shown in FIG. 4, the scale disc 4 comprises a hole 14 through its middle, through which the cylindrical shaft 6 can extend when the scale disc 4 is mounted on the cylindrical shaft 6. In accordance with the present invention, the disc scale member 4 comprises a number of cantilevered spring members 16 which are provided in plane with the planar disc and spaced around the edge of the hole 14, for engaging with, and radially locating the scale disc 4 on, the cylindrical shaft 6 when it is inserted therethrough.

As identified in FIG. 4, the disc scale member 4 comprises three pairs of cantilevered spring members 16a, 16b, 16c. Each pair of cantilevered spring members 16a, 16b, 16c is provided in plane with the planar scale disc 4 and spaced around the edge of the hole 14. Also, each pair of cantilevered spring members 16a, 16b, 16c is configured such that the free ends 18 of the cantilevered spring members 16 are proximal each other and their fixed ends 20 are distal each other (e.g. see FIG. 5). In other words, the cantilevered spring members 16 in each pair 16a, 16b, 16c point toward each other, rather than away from each other.

Figure 5:
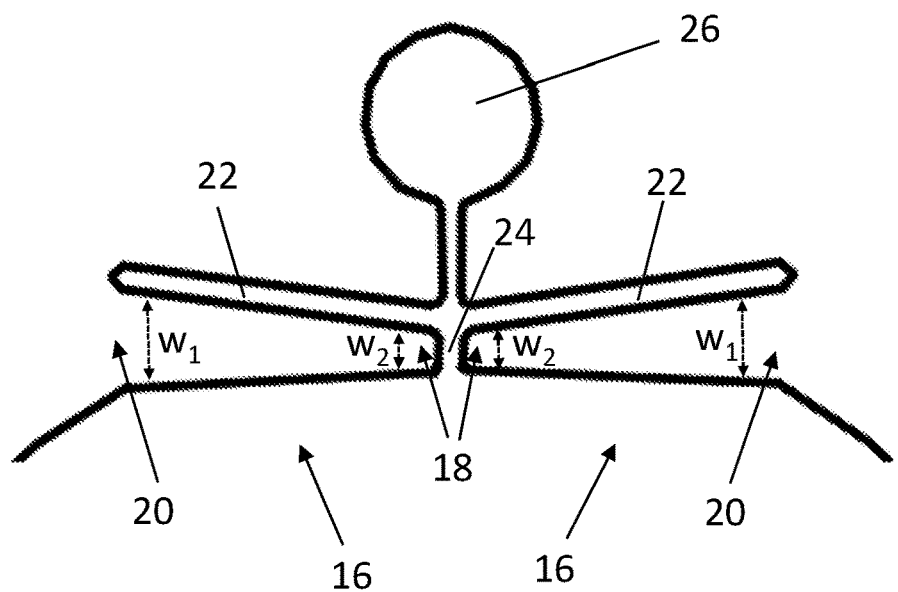
FIG. 5 is a detailed view of the spring members of the disc scale member of FIG. 1.

As shown in FIGS. 4 and 5, each cantilevered spring member 16 is tapered such that it narrows towards its free end 18. Accordingly, the width $w_1$ of a cantilevered spring member is greater at its fixed end 20 than its width $w_2$ at its free end 18. As will be understood, the exact desired dimensions of the cantilevered spring member will depend on a number of factors including the material, size of the disc, and the desired spring force. Our inventors have found a good desired spring force of each flexure in a pair can be about 20 Newtons, which provides a good balance between providing sufficient self-locating ability and not over gripping the shaft.

In the embodiment described, the shaft-engaging side/edge of the cantilevered spring member 16 is straight. Such a configuration has been found to be particularly advantageous from a manufacturing and performance point of view. In particular, our inventors have identified that whilst for even force distribution reasons the ideal shape of a cantilevered spring member might be parabolic, manufacturing such a shaped flexure can be difficult, and the rate of change of force can vary significantly as the contact point between the cantilevered spring member and shaft changes. Accordingly, our inventors have found that providing a straight edged contact face for the cantilevered spring member is an optimum compromise between good force distribution whilst enabling contact close to the free end of the cantilevered spring member, as well as being simple and therefore cost effective to manufacture. Also, in the embodiment described, the width of the cantilevered spring member 16 reduces linearly.

In the embodiment described, each cantilevered spring member 16 is formed by creating, in the same piece/sheet of material as the scale disc 4, a slot 22 (which sits behind the cantilevered spring members 16) and a gap 24 (which sits between the free ends 18 of the cantilevered spring members 16). The slot 22 and gap 24 enable the cantilevered spring members 16 to flex along their length, into the slot 22. Such a slot 22 and gap 24 can be formed, for instance, by etching and/or machining the scale disc 4. Optionally, the scale disc 4, along with its cantilevered spring members 16, is formed by a moulding, casting and/or additive process.

When the scale disc 4 is push-fit onto a shaft 6 which is slightly larger than the space between the pairs of the cantilevered spring members 16a, 16b, 16c, the shaft 6 engages the side of each of the cantilevered spring members 16 facing the middle of the hole 14, and causes each of them to bend slightly into the slot 22. The elasticity of the material of the cantilevered spring members 16 causes a reaction force on the shaft 6. Preferably, the reaction force provided by each cantilevered spring member 16 is nominally the same, such that the scale disc 4 self-centres on the shaft 6. Such nominally identical reaction forces can be achieved by configuring the cantilevered spring members 16 such that they are nominally identical in shape and size, as they are in the embodiment described.

If desired, the scale disc 4 can be further secured to the shaft. For example, in the embodiment described, the scale disc 4 comprises three holes 26 through which mechanical fasteners 28, such as a bolts 28, can be passed in order to secure the scale disc 4 to the shaft 6. Optionally, adhesive could be applied in the hole 26 region so as to secure the scale disc 4 to the shaft 6 (with or without a mechanical fastener 28). In the embodiment shown, the hole 26 for the fastener is connected to the slot 22. Doing so means that the manufacturing process is much simpler and efficient because the hole 26 and slot 22 can be formed in one continuous process. However, as will be understood, this need not be the case and so the hole 26 and slot 22 could be disconnected/separate. Also, in the embodiment shown, an alignment feature (in this case a hole) 30 is provided. Such an alignment hole 30 can be used to ensure that the disc 4 is oriented correctly when it is mounted on the shaft 6. For instance, the shaft 6 could comprise a projecting pin (not shown) such that the disc 4 can only sit flush against the shaft 6 when the projecting pin and alignment hole 30 are aligned.

Figure 6:
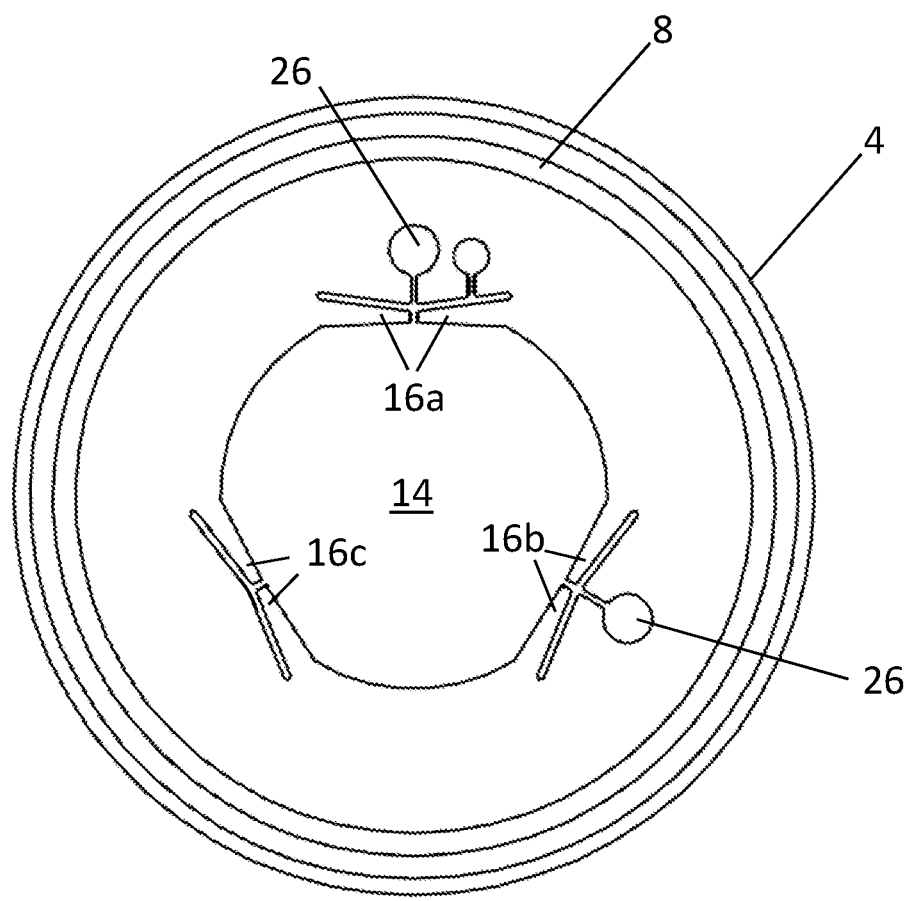
FIG. 6 is a plan view of a disc scale member according to another embodiment of the invention.

As will be understood, such holes 26 for the fasteners are optional and there could be fewer than three such holes (e.g. as shown in FIG. 6) or optionally the disc scale member could be provided without any such holes for fasteners.

In the embodiment described, the scale disc's hole 14 is irregular in shape. In particular, the side of each cantilevered spring that faces the centre of the hole is straight, whereas the shape of the hole between the pairs of cantilevered springs is curved. Whilst it has been found advantageous to provide cantilevered springs with straight edges for engaging with a shaft, the shape of the hole between the pairs of cantilevered springs is less important and need only be sufficiently shaped and sized such that it does not engage a cylindrical shaft extending therethrough (so as not to impact the self-locating effect of the cantilevered springs).

In the described embodiment, three pairs of cantilevered springs 16a, 16b, 16c are provided. However, whilst this has been found to be the optimal solution, other configurations are possible. For example, four pairs of cantilevered springs could be provided. Optionally, a number of (e.g. three or four) individual cantilevered springs could be provided around the side of the hole, instead of the cantilevered springs being provided in pairs.

As shown, in the described embodiment, preferably the cantilevered springs (or the pairs of cantilevered springs) are arranged equiangularly around the hole. This does not necessarily have to be the case, but such an arrangement can be simplest when trying to balance the forces provided by the cantilevered springs so as to have a self-centring effect.

The invention claimed is:

1. A rotary scale apparatus for an encoder apparatus, the rotary scale apparatus comprising a planar disc comprising:
   at least one track of scale features for reading by a readhead;
   a through hole; and
   at least three integral cantilevered spring members which are (i) provided substantially in plane with the planar disc, (ii) spaced around an edge of the through hole, and (iii) for engaging with, and radially locating the planar disc on, a cylindrical shaft inserted through the through hole.

2. The rotary scale apparatus as claimed in claim 1, wherein at least one of the cantilevered spring members extends around the edge of the through hole in an opposite direction to another of the cantilevered spring members.

3. The rotary scale apparatus as claimed in claim 1, wherein
   the at least three integral cantilevered spring members comprise at least three pairs of cantilevered spring members provided in plane with the planar disc and spaced around the edge of the through hole, and
   the cantilevered spring members in each of the pairs extend in opposite directions relative to each other.

4. The rotary scale apparatus as claimed in claim 3, wherein the spring members in a pair of the at least three pairs have free ends proximal to each other and fixed ends distal from each other.

5. The rotary scale apparatus as claimed in claim 1, wherein a width of a spring member of the at least three cantilevered spring members, measured between sides facing toward and away a centre of the through hole, progressively narrows towards a free end of the spring member.

6. The rotary scale apparatus as claimed in claim 1, wherein at least a side of a spring member of the at least three cantilevered spring members facing toward a centre of the through hole is substantially straight.

7. The rotary scale apparatus as claimed in claim 1, wherein the planar disc comprises a metal disc.

8. The rotary scale apparatus as claimed in claim 1, wherein the cantilevered spring members and the planar disc are formed from a single sheet of material.

9. The rotary scale apparatus as claimed in claim 1, wherein the at least one track comprising of scale features is provided on a planar face of the planar disc.

10. The rotary scale apparatus as claimed in claim 1, further comprising at least one additional hole located between the through hole for the shaft and an outer edge of the planar disc.

11. The rotary scale apparatus as claimed in claim 1, wherein a thickness of the planar disc is not less than 0.5 mm and not more than 5 mm.

12. The rotary scale apparatus as claimed in claim 1, wherein each of the at least three cantilevered spring members has a length that extends in a generally circumferential direction around the edge of the through hole.

13. A rotary scale apparatus for an encoder apparatus, the rotary scale apparatus comprising a planar disc comprising:
   at least one track of scale features for reading by a readhead;
   a through hole; and
   at least three cantilevered spring members which are (i) provided substantially in plane with the planar disc, (ii) spaced around an edge of the through hole, and (iii) for engaging with, and radially locating the planar disc on, a cylindrical shaft inserted through the through hole, wherein
   each of the at least three cantilevered spring members has a length that extends in a generally circumferential direction around the edge of the through hole.

14. The rotary scale apparatus as claimed in claim 13, wherein at least one of the cantilevered spring members extends around the edge of the through hole in an opposite direction to another of the cantilevered spring members.

15. The rotary scale apparatus as claimed in claim 13, wherein the at least one track of scale features is provided on a planar face of the planar disc.

16. An apparatus comprising first and second relatively rotatable parts, wherein
   the rotary scale apparatus as claimed in claim 13 is mounted on one of the first and second relatively rotatable parts, for rotation therewith, and
   at least one readhead is mounted on the other of the first and second relatively rotatable parts for reading the scale features on the rotary scale apparatus.

17. An apparatus comprising first and second relatively rotatable parts, wherein
   the rotary scale apparatus as claimed in claim 1 is mounted on one of the first and second relatively rotatable parts, for rotation therewith, and at least one readhead is mounted on the other of the first and second relatively rotatable parts for reading the scale features on the rotary scale apparatus.

18. A rotary scale apparatus for an encoder apparatus, the rotary scale apparatus comprising a planar disc comprising:
at least one track of scale features for reading by a readhead on a face of the planar disc;
a through hole; and
at least three integral cantilevered spring members which are (i) provided substantially in plane with the planar disc, (ii) spaced around an edge of the through hole, and (iii) for engaging with, and radially locating the planar disc on, a cylindrical shaft inserted through the through hole, wherein
each of the at least three cantilevered spring members has a length that extends in a generally circumferential direction around the edge of the through hole, and
at least one of the cantilevered spring members extends around the edge of the through hole in an opposite direction to that of another of the cantilevered spring members.

19. The rotary scale apparatus as claimed in claim 18, wherein
a width of a spring member of the at least three cantilevered spring members, measured between sides facing toward and away from a centre of the through hole, progressively narrows towards a free end of the spring member, and
at least a side of a spring member of the at least three cantilevered spring members facing toward the centre of the through hole is substantially straight.

20. An apparatus comprising first and second relatively rotatable parts, wherein
the rotary scale apparatus as claimed in claim 18 is mounted on one of the first and second relatively rotatable parts, for rotation therewith, and
at least one readhead is mounted on the other of the first and second relatively rotatable parts for reading the scale features on the rotary scale apparatus.

* * * * *